US010945366B2

(12) United States Patent
Desai et al.

(10) Patent No.: US 10,945,366 B2
(45) Date of Patent: Mar. 16, 2021

(54) CUTTER HOUSING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventors: Shivang Desai, Carrboro, NC (US); Christopher Todd Walker, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 16/299,332

(22) Filed: Mar. 12, 2019

(65) Prior Publication Data

US 2020/0288632 A1 Sep. 17, 2020

(51) Int. Cl.
*A01D 34/71* (2006.01)
*A01D 34/76* (2006.01)
*A01D 34/68* (2006.01)
*A01D 34/66* (2006.01)
*A01D 34/81* (2006.01)
*A01D 42/00* (2006.01)
*A01D 34/00* (2006.01)

(52) U.S. Cl.
CPC .......... *A01D 34/71* (2013.01); *A01D 34/005* (2013.01); *A01D 34/668* (2013.01); *A01D 34/6806* (2013.01); *A01D 34/76* (2013.01); *A01D 34/81* (2013.01); *A01D 42/005* (2013.01)

(58) Field of Classification Search
CPC ..................................................... A01D 34/71
See application file for complete search history.

(56) References Cited

U.S. PATENT DOCUMENTS

| 4,425,751 A | * | 1/1984 | Bousseau | A01D 45/007 56/10.2 R |
| 4,427,084 A | * | 1/1984 | Savard, Jr. | B62B 3/12 180/19.3 |
| 5,444,927 A | * | 8/1995 | Sosenko | E01H 5/045 37/244 |
| 5,771,672 A | * | 6/1998 | Gummerson | A01D 34/64 56/15.4 |
| 5,826,416 A | * | 10/1998 | Sugden | A01D 34/71 56/320.2 |
| 6,189,406 B1 | * | 2/2001 | Kapes | E05B 79/20 29/434 |
| 6,425,205 B2 | * | 7/2002 | Wygle | E05F 15/619 296/56 |
| 6,609,358 B1 | | 8/2003 | Schmidt et al. | |
| 6,735,932 B2 | | 5/2004 | Osborne | |

(Continued)

*Primary Examiner* — Thomas B Will
*Assistant Examiner* — Madeline Ivy Runco
(74) *Attorney, Agent, or Firm* — Kenealy Vaidya LLP

(57) ABSTRACT

Various types of lawnmowers are disclosed that include a cutter housing having a cutting chamber and a discharge opening therein. A driving mechanism can be mounted on the cutter housing, and a radius arm can be mounted on or near the blade spindle such that the radius arm is rotatable about the blade spindle. A shutter gate that is arcuate in shape can be mounted on the radius arm so as to rotate with the radius arm between a discharge arrangement and a mulch arrangement. The shutter gate can include a driven element that is driven by the driving mechanism to cause the shutter gate to rotate between the discharge arrangement where the shutter gate allows for discharge of vegetation through the discharge opening, and the mulch arrangement where the shutter gate blocks the discharge opening.

19 Claims, 7 Drawing Sheets

(56) References Cited

U.S. PATENT DOCUMENTS

| | | | |
|---|---|---|---|
| 6,751,937 B2 * | 6/2004 | Kobayashi | A01D 34/71 |
| | | | 56/202 |
| 6,843,048 B2 * | 1/2005 | Osborne | A01D 42/005 |
| | | | 56/320.2 |
| 6,874,309 B1 * | 4/2005 | Bellis, Jr. | A01D 42/005 |
| | | | 56/320.2 |
| 6,874,310 B2 | 4/2005 | Osborne | |
| 6,990,793 B2 * | 1/2006 | Osborne | A01D 42/005 |
| | | | 56/320.1 |
| 7,055,301 B2 | 6/2006 | Osborne et al. | |
| 7,065,946 B2 | 6/2006 | Boeck et al. | |
| 7,174,700 B2 | 2/2007 | Chenevert et al. | |
| 7,735,246 B2 * | 6/2010 | Kaskawitz | E01H 5/045 |
| | | | 37/260 |
| 7,775,027 B2 * | 8/2010 | Wang | A01D 34/71 |
| | | | 56/320.2 |
| 7,841,044 B1 * | 11/2010 | Weihl | A01G 20/47 |
| | | | 15/340.1 |
| 8,234,849 B2 * | 8/2012 | Shimozono | A01D 42/005 |
| | | | 56/320.1 |
| 8,387,205 B2 * | 3/2013 | Weihl | A01D 42/06 |
| | | | 15/347 |
| 9,485,911 B2 | 11/2016 | Thorman et al. | |
| 9,510,516 B2 * | 12/2016 | Shumaker | B08B 5/02 |
| 9,750,179 B2 | 9/2017 | Korthals et al. | |
| 10,045,481 B2 * | 8/2018 | Chase | A01D 34/71 |
| 10,412,888 B2 * | 9/2019 | Matway | A01D 41/1271 |
| 2003/0217542 A1 * | 11/2003 | Osborne | A01D 42/005 |
| | | | 56/320.1 |
| 2018/0325024 A1 * | 11/2018 | Rotole | A01D 57/24 |

\* cited by examiner

CUTTER HOUSING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, and walk-behind mowers. Some walk-behind mowers can include a prime mover mounted to the deck of the lawnmower. Mower decks associated with garden tractors, riding mowers and other walk-behind mowers can be removably attached to the frame of such self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching systems in which one or more movable components can be moved into any one of a plurality of positions between the mulching position and the discharging position such that some of the clippings are mulched and some of the clippings are directly discharged without mulching, via the discharge chute, into a collection bag or onto the ground.

SUMMARY

Some embodiments of the disclosed subject matter are directed to a cutter housing assembly for a lawnmower that includes a cutter housing having a chamber wall and a discharge opening.

In accordance with an aspect of the disclosed subject matter, a cutter housing assembly for a lawnmower can include a cutter housing having a cutting chamber with a discharge opening and a blade spindle for supporting a cutting blade. A driving mechanism can be mounted on the cutter housing. A radius arm can be mounted on the blade spindle such that the radius arm is rotatable about the blade spindle. A shutter gate can be arcuate in shape and mounted on the radius arm so as to rotate with the radius arm. Rotation of the shutter gate can provide (a) a discharge arrangement at a first position in which the shutter gate is positioned relative to the discharge opening to provide a first gap associated with the first discharge opening, and (b) a mulch arrangement at a second position different from the first position and in which the shutter gate is positioned relative to the discharge opening to provide a decreased gap, relative to the first gap, associated with the first discharge opening. The shutter gate can include a driven element, and the driving mechanism can be engaged with the driven element to rotate the shutter gate.

In accordance with another aspect of the disclosed subject matter, a cutter housing assembly for a lawnmower can include a cutter housing that has a cutting chamber, with a discharge opening, and a blade spindle for supporting a cutting blade. The cutter housing can include a top wall. A driving mechanism can be mounted on the cutter housing, and the driving mechanism can include a motor. A radius arm can be mounted on the top wall of the cutter housing and configured to rotate about a blade spindle axis. A shutter gate can be curved in shape and mounted on the radius arm so as to rotate with the radius arm about the blade spindle axis. The shutter gate can be rotatable between (a) a discharge position in which the shutter gate is positioned relative to the discharge opening to provide a first gap associated with the first discharge opening, and (b) a mulch position in which the shutter gate is located relative to the discharge opening to provide a decreased gap, relative to the first gap, associated with the first discharge opening. The shutter gate can include a driven element, which is disposed above the top wall. The driving mechanism can be operatively engaged with the driven element to cause the shutter gate to rotate when the driving mechanism is actuated.

In accordance with yet another aspect of the disclosed subject matter, a lawnmower can include a prime mover that provides power to the lawnmower. At least one cutter housing assembly can include a cutter housing that has a cutting chamber with a discharge opening. A blade spindle can be provided for supporting a cutting blade. A driving mechanism can be mounted on the cutter housing, and a radius arm can be mounted on the cutter housing and configured to rotate about a blade spindle axis. A shutter gate that is arcuate in shape can be mounted on the radius arm so as to rotate with the radius arm between (a) a discharge position in which the shutter gate is located relative to the discharge opening to provide a first gap associated with the first discharge opening, and (b) a mulch position in which the shutter gate is located relative to the discharge opening to provide a decreased gap, relative to the first gap, associated with the first discharge opening. The shutter gate can include a driven element provided at an upper portion of the shutter gate, and the driving mechanism can be engaged with the driven element to cause the shutter gate to rotate when the driving mechanism is actuated.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
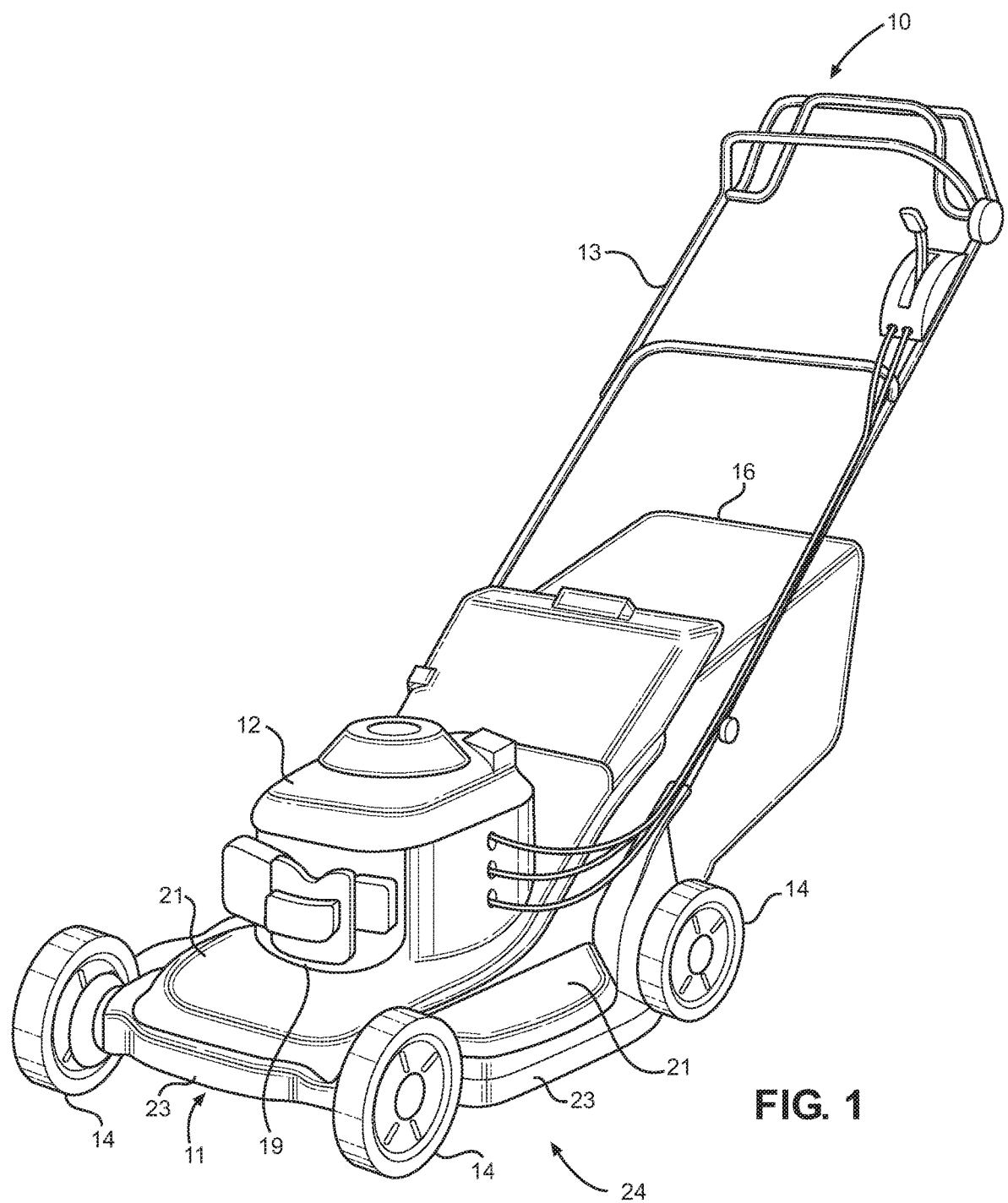
FIG. 1 is a perspective view of an embodiment of a lawnmower made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies are known that convert a lawnmower between a "discharge" mode and a "mulch" mode. Some mulching assemblies remain mounted in the cutter housing of the lawnmower and require many components, including different doors, levers, and rotating gears that facilitate conversion from a full mulching mode to a discharge mode. However, these many components can result in a labor-intensive assembly for manufacturing and/or for operation and maintenance. Thus, the manufacturing and operating cost for lawnmowers with automatic cutting/mulching conversion devices can be greater as compared to a lawnmower that includes a removable mulching conversion assembly. However, removal and installation processes for removable mulching conversion assemblies are typically inconvenient and time consuming. Thus, there is a need for an automatic mulching conversion assembly that can reduce manufacturing and operation cost and lessen or avoid any inconvenience perceived by the operator when converting the lawnmower between the discharge mode and the mulching mode.

In accordance with aspects of the disclosure, an assembly is provided with a shutter door or gate that can be manipulated to convert a lawnmower from a discharge mode to a mulching mode. The shutter gate can be configured to move (e.g., rotate) to obstruct or close one or more discharge openings in the cutter housing. The user can remotely actuate the shutter gate to move between the mulching mode position and the discharge mode position. The shutter gate can be used with a lawnmower or cutter housing that includes one blade, or more than one blade. The shutter gate can be implemented in a walk-behind lawnmower, in a cutter housing of a riding mower or in a cutter housing of a garden tractor.

The disclosed assembly can allow the user to change the cutting mode from all mulching to side discharge (and to intermediary positions therebetween) without the need for installing extra parts and in a smooth and simple operation requiring few parts. Conversion can also be accomplished without interrupting the cutting operation of the lawnmower.

The disclosed assembly can include steel doors or gates that are installed so as to overlap with deck walls in a discharge mode and to not overlap, or overlap less, with deck walls in a mulch mode or arrangement. The steel gates, which can be characterized as shutter gates, can be provided in back of the deck walls. Each shutter gate can be rotatable on an arm. The arm can be mounted on or near a blade spindle. The shutter gate can be operated by an electric motor with gear assembly that is meshed with gear teeth on the rotatable shutter gate. The gear teeth can include a curved or arcuate gear rack. When a user operates a regulator, control regulator, or other control unit, the user can control whether the shutter gates are rotated a first direction to close the deck openings, or rotated an opposing direction so as to open the deck openings. The control unit can be located at a control console. The mower deck can include multiple blades with each blade associated with a shutter gate. Each shutter gate can be arcuate in shape and attached to a radius arm so as to rotate in a concentric manner about each respective blade axis. The shutter gate and associated motor unit can be positioned on top of the mower deck, or alternatively underneath or to the side of the mower deck. A regulator can control the shutter gate so as to provide different closing options, which gives variable mulching features. Variable mulching gives a user desired control over mulching of vegetation. Multiple doors or shutter gates can be mounted at each section or portion of the mower deck.

Figure 2:
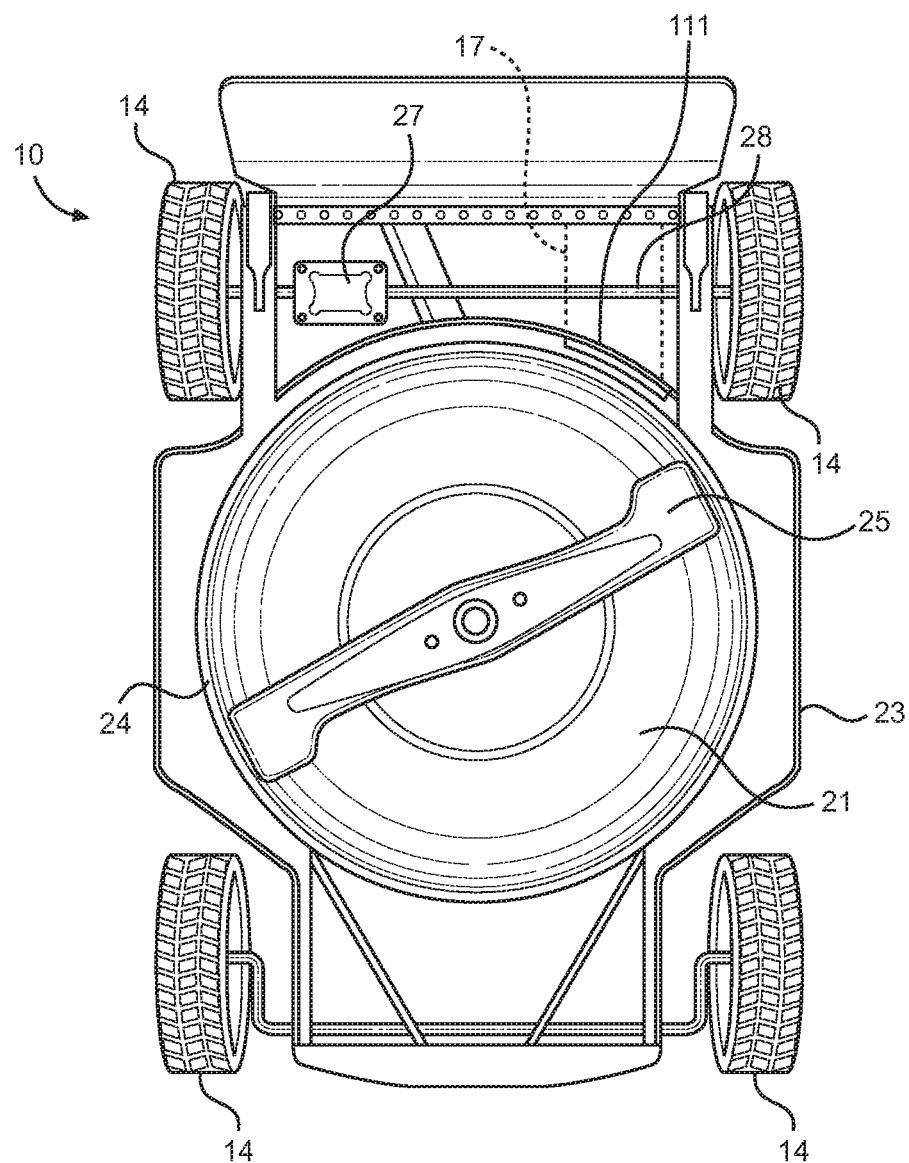
FIG. 2 is a bottom view of the lawnmower, with cutter housing, as shown in FIG. 1.

FIG. 1 is a perspective view of an exemplary lawnmower 10, and specifically a walk-behind lawnmower. FIG. 2 is a bottom view of the lawnmower of FIG. 1. The lawnmower 10 can include a cutter housing assembly that includes a cutter housing 11, and a shutter gate assembly as described below with respect to exemplary embodiments illustrated in FIGS. 5-9, and at least one blade 25 rotatably supported by the cutter housing 11. The cutter housing 11 can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. Referring to FIG. 2, the prime mover 12 can drive a driveshaft that supports at least one blade 25. The blade 25 can rotate in a cutting chamber 24 defined by the cutter housing 11 and opened toward the ground. In operation of the lawnmower, the prime mover 12 rotates the driveshaft, which, in turn, rotates the blade 25. As a result, the lawnmower 10 can perform a mowing operation on vegetation, such as to mow a lawn.

As shown in FIG. 1, the lawnmower 10 can include a steering handle 13 and a plurality of wheels 14. The steering handle 13 can be used by a user to operate the lawnmower 10 and guide the path of travel of the lawnmower 10. The steering handle 13 can include or be associated with various control mechanisms. Such control mechanisms can include speed controls for self-propelled lawnmowers, safety stop levers or bars, which the user depresses or holds to maintain the lawnmower in a running state, etc. In a self-propelled lawnmower, the wheels 14 at the rear of the lawnmower 10 can be driven so as to propel the lawnmower 10.

The cutter housing 11 can also include a discharge chute 17 and the lawnmower 10 can include a collection bag 16. The discharge chute 17 can be located at the rear of the cutter housing 11 and adjacent to the wheel 14 at the right rear of the cutter housing 11, for example. The discharge chute 17 can be in communication with the cutting chamber 24 and oriented to discharge the vegetation clippings toward the side of the lawnmower 10 or toward the rear of the lawnmower 10. In the exemplary embodiment of FIG. 1, the discharge chute can discharge the clippings toward the rear of the lawnmower 10. When the lawnmower 10 is in a discharging mode, lawn clippings, for example, can be propelled from the cutting chamber 24, in which blade 25 spins and in which vegetation is cut by the spinning blade of the lawnmower 10 into the discharge opening and through a discharge chute. The clippings can pass through the discharge chute 17 and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute and onto the ground. Additionally, the lawnmower 10 can include a gearbox 27 that drives rear axle 28. The gearbox 27 can be mechanically and operatively connected to the prime mover 12 so as to provide power to the rear axle 28.

As shown in FIG. 1 and FIG. 2, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can also be integrally formed with the sidewall(s) 23. For example, the top wall 21 and the sidewall(s) 23 can be integrally formed of stamped or cast metal or of molded plastic construction. In the exemplary embodiment of FIG. 1, the cutter housing 11 can be stamped from a steel sheet. A shutter gate 111 can be included in the cutter housing 11 that is slidable in rotation about the blade axis between a mulch mode and a discharge mode and positions therebetween. (Emphasis Added).

Figure 3:
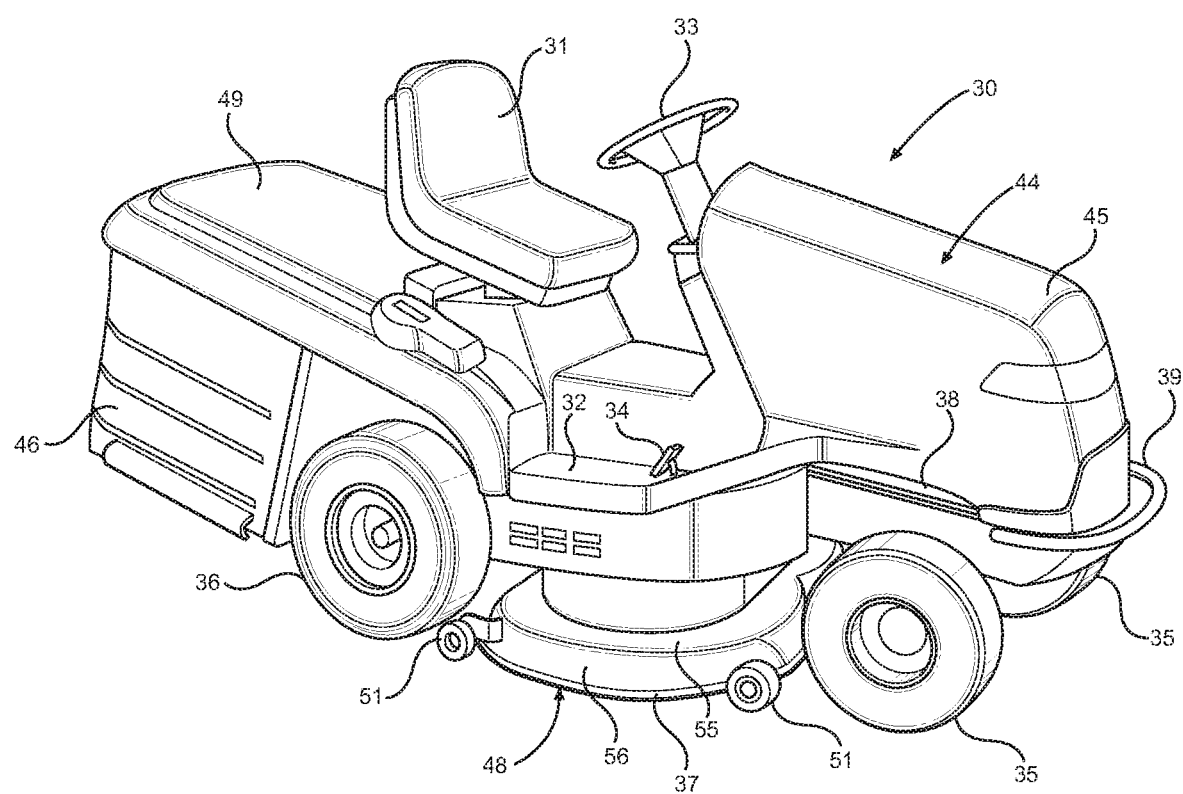
FIG. 3 is a perspective view of another embodiment of a lawnmower made in accordance with principles of the disclosed subject matter.

FIG. 3 is a perspective view of another embodiment of a lawnmower 30 in the form of a riding lawnmower or a garden tractor. The lawnmower 30 can support a human operator who rides on the lawnmower 30. The operator can be supported by a seat 31 and one or more foot supports 32 of the lawnmower. For example, the lawnmower 30 in the form of a garden tractor can be configured to perform tasks other than cutting vegetation by adding one or more implements such as but not limited to a rotary brush, a tiller, a snow blower, or a front-mounted blade or bucket. The lawnmower 30 in the form of a riding mower can also be configured exclusively for cutting vegetation. FIG. 3 illustrates the lawnmower 30 in the form of a garden tractor.

The operator can control movement of the lawnmower 30 on a lawn, terrain, or other surface using a steering wheel 33, one or more control pedals 34, and/or other control mechanisms. The control pedals 34 can be provided on or adjacent to the foot supports 32 of the lawnmower 30. For example, a control pedal 34 can be configured as an accelerator to provide control of travel speed of the lawnmower 30 and can also be associated with a clutch and transmission to control forward/reverse direction and speed ranges for the lawnmower 30. The lawnmower 30 can include a pair of front wheels 35 and a pair of rear wheels 36.

The lawnmower 30 can include a cutter housing assembly that includes a cutter housing 37, a shutter gate 111 assembly described in more detail below, and a pair of blades 40, 41 rotatably supported by the cutter housing 37. The cutter housing 37 can also be referred to as a deck or as a mower deck or as a cutter deck of the lawnmower 30. The cutter housing 37 can be removably mounted to a frame of the lawnmower 30. The shutter gates 111 can be included in the cutter housing 11 and can be slidable in rotation about each blade axis between a mulch mode and a discharge mode and positions therebetween. (Emphasis Added).

Figure 5:
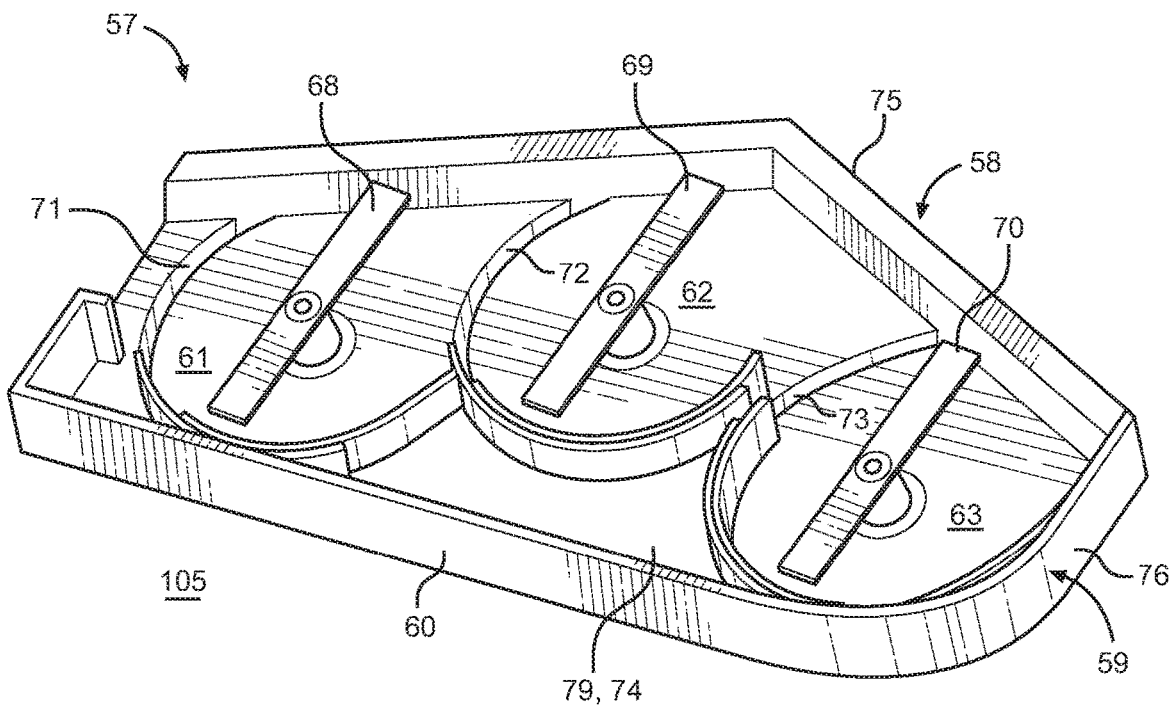
FIG. 5 is a bottom perspective view of another embodiment of a lawnmower cutter housing, in a discharge arrangement, made in accordance with principles of the disclosed subject matter.

However, alternate embodiments of the cutter housing 37 can include any appropriate or desired number of blades. For example, FIG. 5 shows an alternate embodiment of a cutter housing 58 for use with the lawnmower 30 that supports three blades 68, 69, 70.

Figure 4:
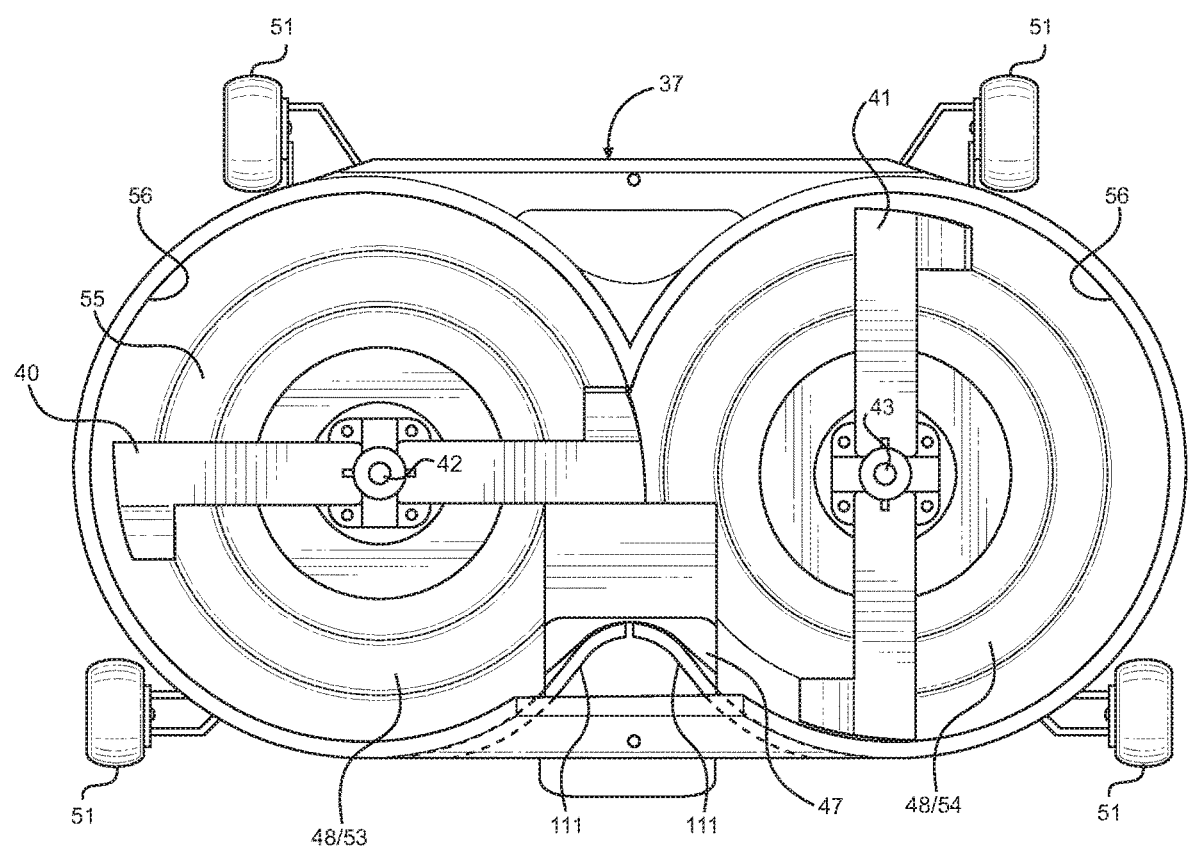
FIG. 4 is a bottom view of the lawnmower, with cutter housing with two blades, as shown in FIG. 3.

Referring to FIG. 4, the blades 40, 41 can rotate in a cutting chamber 48 defined by the cutter housing 37 and opened toward the ground. In operation of the lawnmower 30, the prime mover 38 can rotate a driveshaft that can be mechanically connected to the blades 40, 41, such as by first driven shaft 42 and second driven shaft 43.

The prime mover 38 can be in the form of a gasoline engine or an electric motor. The prime mover 38 can also supply power for driving the one or more wheels 35, 36 of the lawnmower.

Any appropriate power transmission mechanism can transfer power from the prime mover 38 to the driven wheel(s) such as but not limited to a fluid pump and hydrostatic motor system or a multiple ratio gear transmission system. The gear transmission system can be connected to the prime mover by one or more driveshaft(s), or by a belt and pulley system.

The lawnmower 30 can include a frame or chassis 39. The frame 39 can provide a main supporting structure of the lawnmower 30 to which various components of the lawnmower 30 are attached. The wheels 35, 36 can be attached to axles that in turn can be attached to the frame 39 of the lawnmower. The prime mover 38 can be attached to the frame 39 and mechanically connected to the powered wheels so as to propel the lawnmower 30.

The frame 39 of the lawnmower 30 can also support a body 44 of the lawnmower 30. The body 44 can provide an outer, finished surface that can cover the frame 39, prime mover 38, and other components or portions of components of the lawnmower 30. The body 44 can include a hood or engine hood 45. The hood 45 can cover at least a portion of the prime mover 38.

The lawnmower 30 can also include a collection bag 46 supported by the frame 39. A discharge opening and/or passageway 47 can be provided to transfer clippings from cutting chamber 48 to the collection bag 46 when the lawnmower 30 is in a discharge mode. The body 44 of the lawnmower 30 can include a collection bag cover 49 positioned over the collection bag 46.

The lawnmower 30 can include a cutter housing lift assembly that controls height of the cutter housing 37 relative to the ground (and to frame 39). The cutter housing 37 can be provided with housing wheels or housing rollers 51. The housing rollers 51 can limit how close the cutter housing 37 or particular portion of the cutter housing 37 gets into the lawn.

FIG. 4 is a bottom view of a cutter housing 37 shown in FIG. 3. The cutting chamber 48 can include a first cutting chamber 53 and a second cutting chamber 54. In other arrangements, additional cutting chambers can be provided. The first cutting chamber 53 houses a first blade 40. The second cutting chamber 54 houses a second blade 41. The first blade 40 and the second blade 41 can be driven, so as to cut grass or other vegetation, as described above.

The lawnmower shown in FIG. 4 has a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a timing belt or a shaft and gear drive or other similar arrangement that limits or prevents rotation of one the blades 40, 41 relative to the other of the blades 40, 41. In the illustrated synchronous cutter housing layout, the cutting circle in which the first blade 40 rotates can intersect the cutting circle in which the second blade 41 rotates such that first blade 40 enters the cutting circle of the second blade 41 and the second blade 41 enters the cutting circle of the first blade 41. Accordingly, it can be advantageous to synchronize rotation of the first blade 40 with rotation of the second blade 41 so that the two blades 40, 41 can avoid a collision or interference with each other. Such intersection of the cutting circles of the two blades 40, 41 can be desired so as to provide effective cutting coverage of the lawn. In other words, such intersection of the cutting circles of the two blades 40, 41 can be desirable so that cross-over of the blades 40, 41 is provided and vegetation between the centers of the two blades 40, 41 is cut.

The cutter housing 37 can include a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56. The top wall 55 and the sidewall(s) 56 can form at least portions of the first cutting chamber 53 and the second cutting chamber 54 shown in FIG. 4. For example, the top wall 55 and the sidewall(s) 56 can be integrally formed of stamped or cast metal or of molded plastic construction.

The cutter housing 37 shown in FIG. 4 can include a rear discharge layout. That is, a discharge opening 47 can be provided at the rear of the cutter housing 37. The discharge opening 47 can be in communication with each of the first and second cutting chambers 53, 54. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag 46. The collection bag 46 can then be emptied at a point in time as may be desired. A shutter gate(s) 111 can be included in the cutter housing 48 and are slidable in rotation about a respective blade axis between a mulch mode and a discharge mode, and positions therebetween that close and open access to the discharge opening 47 as desired.

FIGS. 5-9 illustrate an embodiment of a cutter housing assembly 57 including a cutter housing 58, shutter gate assemblies 101, 102, 103 and a plurality of blades 68, 69, 70. The exemplary cutter housing assembly 57 is usable with the lawnmower 30 configured as ride behind, stand behind, walk behind, zero-turn, garden tractor, hover lawnmower, robotic lawnmower, cylinder mower, rotary mower, for example. As will be described in further detail below, the exemplary shutter gate assembly 101, as well as shutter gate assemblies 102, 103, can respectively include a shutter door or shutter gate 111, 161, 171. The shutter gates 111, 161, 171 can selectively obstruct or close respective discharge openings of the cutter housing 58 in order to convert the cutter housing 58 between the mulching mode and the discharge mode (and various intermediate modes). The shutter gate assemblies 101, 102, 103 can be configured for use with the cutter housing 11 of FIGS. 1 and 2 or the cutter housing 37 of FIGS. 3 and 4. The shutter gate assemblies 101, 102, 103 can collectively be characterized as a shutter system or gate system 100.

FIG. 5 is a bottom view of the cutter housing 58 and shows features of the cutter housing assembly 57. The cutter housing 58 can also be referred to as a deck or as a mower deck or as a cutter deck of the lawnmower 30. The cutter housing 58 can be removably mounted to a frame 39 of the lawnmower 30. The cutter housing 58 is shown as supporting three blades 68, 69, 70, but can include any appropriate number of blades and associated cutting chambers as deemed appropriate for a particular application.

The cutter housing 58 can include a first cutting chamber 61, a second cutting chamber 62, and a third cutting chamber 63. The cutting chambers 61, 62, 63 can be demarcated or defined by side walls 59 and/or chamber walls 64. The sidewalls 59 can include a rear sidewall 60, a front sidewall 75, and opposing side sidewalls 76 (on the sides of the cutter housing 58). The cutter housing 58 can including a top wall 74. The top wall 74 can include an underside 79 or lower surface 79, as well as an upper surface 80. The chamber walls 64 can include a first chamber wall 65, a second chamber wall 66, and a third chamber wall 67. The first chamber wall 65 can serve to demarcate, at least in part, the first cutting chamber 61. The second chamber wall 66 can serve to demarcate, at least in part, the second cutting chamber 62. The third chamber wall 67 can serve to demarcate, at least in part, the third cutting chamber 63.

Figure 6:
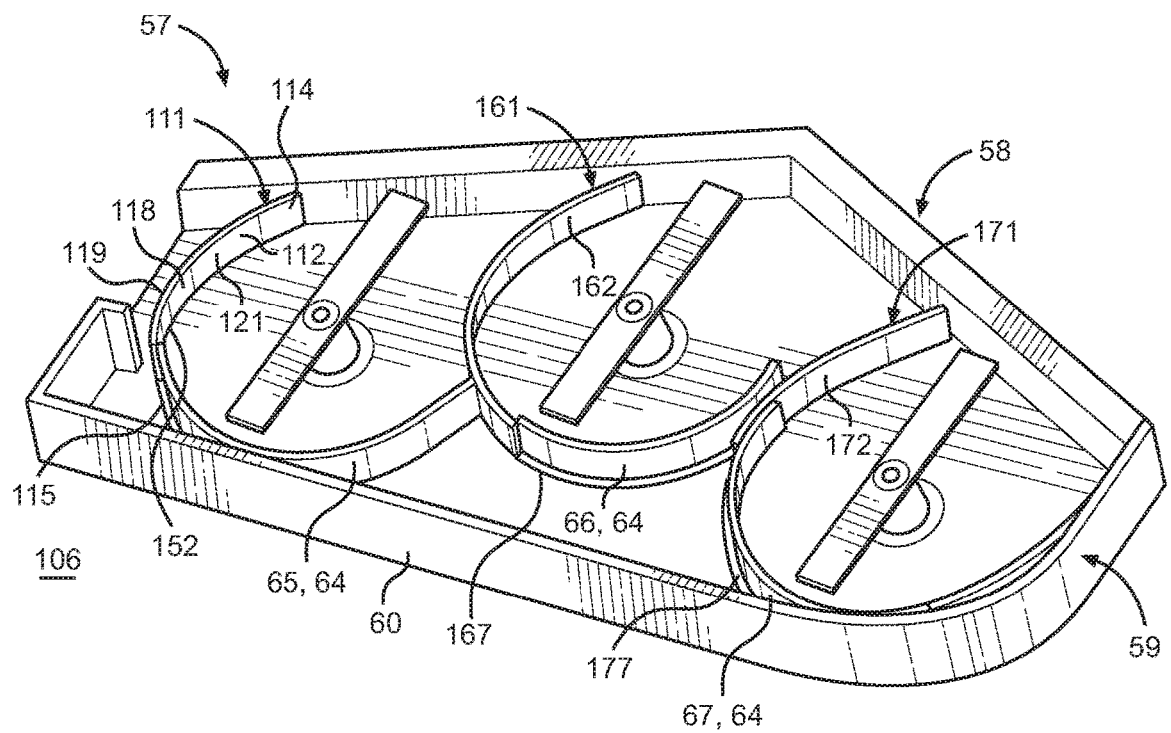
FIG. 6 is a bottom perspective view of the lawnmower cutter housing of FIG. 5 in a mulch arrangement.

Each of the cutting chambers 61, 62, 63 can be provided with a respective rotating blade 68, 69, and 70. The rotating blades can include a first blade 68, a second blade 69, and a third blade 70. Referring to FIGS. 5 and 6, each of the rotating blades 68, 69, and 70 can be mounted on and driven by a respective driven shaft with associated pulley. With respect to the first blade 66 in the first cutting chamber 61, a driven shaft 141 can be in the form of a blade spindle 141 pivotably supported by a bearing assembly 142 in the top wall 74 of the cutter housing 58. The driven shaft 141 or blade spindle 141 can be a part of or included in the bearing assembly 142. The blade spindle 141 can be mechanically powered by the prime mover 38 of the lawnmower 30, in conjunction with a mechanical power transfer arrangement, such as but not limited to the pulley and belt system described above. The blade spindle 141 and bearing assembly 142, which supports the blade spindle 141, can collectively constitute a pivot assembly or spindle assembly 140. As described below, a second shutter gate assembly 102 can include a second spindle assembly 165. A third shutter gate assembly 103 can include a third spindle assembly 175.

The cutter housing 58 of FIG. 5 can include a side discharge layout having a discharge opening 71 on the left-hand side as shown in FIG. 5 with the cutter housing upside down. The cutter housing 58 can include a second discharge opening 72 of the second cutting chamber 62. The cutter housing 58 can include a third discharge opening 73 of the third cutting chamber 62. Alternatively, the cutter housing 58 can be configured as a rear discharge cutter housing such as the exemplary cutter housing 11 of FIGS. 1 and 2, or the exemplary cutting housing 37 of FIGS. 3 and 4.

A shutter gate 111 can selectively obstruct or open the discharge opening 71 of the cutter housing 58 in order to convert the cutter housing 58 between the mulching mode and the discharge mode. FIG. 6 shows the shutter gate 111 in a mulch position in which the shutter gate 111 closes or obstructs the discharge opening 71 and places the cutter housing 58 in the mulching mode.

The first chamber wall 65 and the second chamber wall 66 can include a first common opening or second discharge opening 72. The second discharge opening 72 places the second cutting chamber 62 in communication with the first cutting chamber 61. Accordingly, air and clippings can freely move between the first chamber and the second chamber. The second chamber wall 66 and the third chamber wall 67 can include a second common opening or third discharge opening 73. The third discharge opening 73 places the third cutting chamber 63 in communication with the second cutting chamber 62. As a result, lawn clippings can be propelled, due to the airflow within the cutter housing 58, along the front of the chamber walls 65, 66, 67 and towards the discharge opening 71 where the lawn clippings can exit the discharge opening 71, and exit the cutter housing 58, when the shutter gate 111 does not obstruct or close the discharge opening 71.

The cutter housing 58 of FIG. 5 illustrates an asynchronous cutter housing layout of a mower deck. In such arrangement, the center blade 69 can be positioned, in a longitudinal direction of the lawnmower 30, in front of both of the outboard blades 68, 70. Thus, in the arrangement there may be a path of the cutting circle of the center blade 69 that overlaps the path of the cutting circle for each of the outboard blades 68, 70 as the lawnmower 30 traverses the lawn or terrain. However, because the center blade 69 is positioned in front of the outboard blades 68, 70 the blades do not interfere with each other in rotation, i.e. in a respective cutting circle of each blade. Accordingly, in such an arrangement, synchronizing the rotation of the blades 68, 69, 70 relative to each other can be avoided. Thereby, the blade drive assembly can be simplified in some respects as compared to the exemplary cutter housing 37 of FIGS. 3 and 4.

As shown in FIGS. 5 and 6 and described above, the cutter housing assembly 57 can include cutter housing 58. The cutter housing assembly 57 can also include the shutter gate assembly 101, the second shutter gate assembly 102 and the third shutter gate assembly 103. As described further below, the shutter gate assembly 101 can be similar in structure and function to the second shutter gate assembly 102 and the third shutter gate assembly 103.

The shutter gate assembly 101 can include a shutter gate 111, a radius arm 133, a pivot assembly or spindle assembly 140, a driving mechanism 145, and a guide assembly 151.

The shutter gate 111 can be arcuate or curved in shape. The arcuate or curved shape of the shutter gate 111 can correspond to the arcuate or curved shape of the first cutting chamber 61 and/or the first chamber wall 65. The shutter gate 111 can be mounted on an arm or radius arm 133. The radius arm 133 can be rotatably or pivotably mounted on the spindle assembly or pivot assembly 140. The pivot assembly 140 can include a blade spindle 141 and a bearing assembly 142. The radius arm 133 can be mounted on or near the blade spindle 141, which supports an associated cutting blade.

The radius arm 133 can include an inner end portion 134 and an outer end portion 135. The inner end portion 134 can be rotatably or pivotably attached to the spindle assembly 140. The outer end portion 135, of the radius arm 133, can be affixed to the shutter gate 111. The outer end portion 135 can be welded or otherwise rigidly attached to the shutter gate 111. The shutter gate 111 can be rotated in conjunction with rotation of the radius arm 133. The shutter gate 111 can be rotated so as to open the first discharge opening 71, close the first discharge opening 71, or partially close the first discharge opening 71. In other words, the shutter gate 111 can be mounted on the radius arm 133 so as to rotate between a discharge arrangement 105 and a mulch arrangement 106 and positions therebetween. In the discharge arrangement 105, the shutter gate 111 can be positioned relative to the discharge opening 71 to provide a first gap associated with the discharge opening 71. In the mulch arrangement 106, the shutter gate 111 can be positioned relative to the discharge opening 71 to provide a decreased gap, relative to the first gap, associated with the first discharge opening 71.

The shutter gate 111 can include a driven element 130. The driven element 130 can engage with a driving mechanism 145 so as to impart rotation of the shutter gate 111 and the radius arm 133. The driven element 130 can include a curved gear rack 131. The curved gear rack 131 can include gate gear teeth 132. The curved gear rack 131 can extend along an upper edge 117 of the shutter gate 111. An upper portion 116 and/or an upper edge 117 of the shutter gate 111 can extend through a guide assembly 151 in the top wall 74 of the cutter housing 58. The curved gear rack 131 can be driven by the driving mechanism 145. The driving mechanism 145 can be attached to or affixed to the cutter housing 58.

The driving mechanism 145 can include a driving gear 148 that operatively, rotatably engages with the curved gear rack 131 so as to move the curved gear rack 131 and in turn move the shutter gate 111. The length of the curved gear rack 131 can be provided so as to afford the desired rotational travel. The driving gear 148 can be rotated so as to be positioned at or adjacent a first end 114 of the shutter gate 111 when the shutter gate 111 is in the discharge position. Alternatively, the driving gear 148 can be rotated so as to be positioned at or adjacent to a second end 115, of the shutter gate 111, when the shutter gate 111 is in the mulch position. The driving gear 148 can be rotated so as to be positioned, on the curved gear rack 131, at some interim position so as to provide a partial mulching or partial discharge mode.

The shutter gate 111 can include a curved plate 112. The plate 112 can be curved or arcuate about the first cutting chamber 61. The curvature of the curved plate 112 can be concentric with a center of rotation (or blade rotational axis) of the particular cutting blade in the first cutting chamber 61. The plate 112 can include the first end 114 and the second end 115 and can also include an upper portion 116 that includes an upper edge 117. A lower portion 118 of the plate 112 can include a lower edge 119. The plate 112 can include a first side 120 that faces outwardly from the cutter housing 58 and a second side 121 that faces interior, i.e., that faces the center of the cutting chamber 61.

The first end 114, second end 115, upper edge 117, and lower edge 119 can collectively define the curved plate 112 in the shape of a cylindrical segment. Alternatively, the plate 112 can be of various shapes depending on the particular lawnmower, the particular shape of the cutter housing, and/or the particular shape of the cutting chamber, for example. The cylindrical segment can possess a consistent curvature throughout a length of the plate 112 from the first end 114 to the second end 115, and can form an elliptical shape with the cutter chamber wall. The cylindrical segment can be a segment of a cylinder having uniform diameter in the vertical direction, along a vertical extent of the cylinder and a circumferential extent of the cylinder. The cylindrical segment can be a segment of a cylinder, along a vertical extent of such cylinder and a circumferential extent of such cylinder. The plate 112 can include a radial segment of a cylinder along a vertical extent, wherein such cylinder has a uniform diameter in the vertical direction.

As shown in FIG. 5, the plate 112 can be positioned alongside the chamber wall 65 of the cutting chamber 61 when in the discharge arrangement/position. As shown in FIG. 6, the plate 112 can be positioned alongside only a portion of the chamber wall 65 of the cutting chamber 61 when in the mulch arrangement/position.

The curved gear rack 131 can extend along a portion or entirety of the upper edge 117. Depending on position or placement of the driving mechanism 145, the curved gear rack 131 can be positioned on the first side 120 or the second side 121. The curved gear rack 131 can include gate gear teeth 132 that mesh with the driving gear 148.

Figure 9:
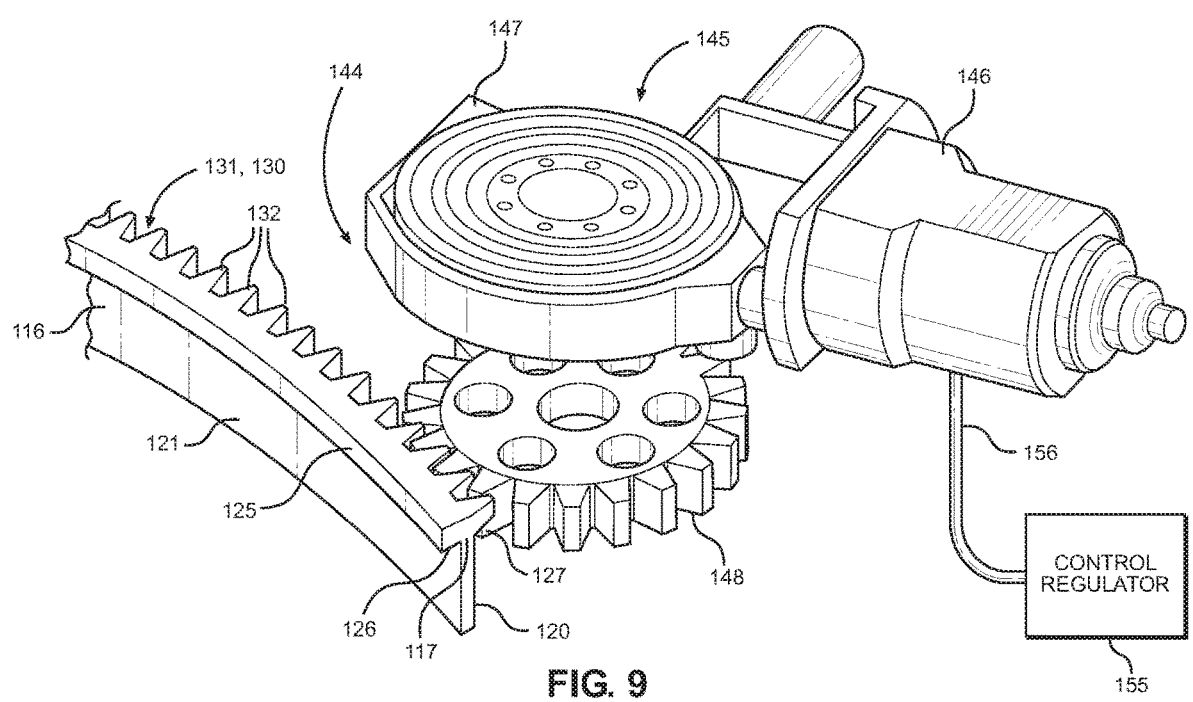
FIG. 9 is a perspective view of a driving mechanism with shutter gate of FIG. 5.

The shutter gate 111 can also include a support slide flange 125. The support slide flange 125 can extend along the entirety of (or portions of) the upper edge 117. The support slide flange 125 and/or each portion of the support slide flange 125 can include a respective lower slide surface 126. The lower slide surface 126 can be provided to guide and support the shutter gate 111 as the shutter gate 111 is rotated about the cutting chamber 61. The lower slide surface 126 can engage with and slide along the upper surface 80 of the top wall 74 of the cutter housing 58. The support slide flange 125 can be positioned on the first side 120 or the second side 121, and/or on an opposing side relative to the curved gear rack 131. Such arrangement is shown in FIG. 9. In at least some embodiments, the support slide flange 125 can be omitted and a lower surface of the curved gear rack 131 can provide a gear lower slide surface 127. In at least one embodiment, both a gear lower slide surface 127 of the curved gear rack 131 and the lower slide surface 126 of the support slide flange 125 can be provided. Accordingly, both slide surfaces 126, 127 can support and guide the shutter gate 111 in rotation of the shutter gate 111 between a mulch arrangement 106 and a discharge arrangement 105.

As shown in FIG. 9, the second side of the curved plate 112 can include an inner, concave surface that faces the interior of the cutting chamber 61. The first side 120 of the plate 112 can include an outer, convex surface that opposes the second side 121 of the plate 112.

As described above, an upper portion 116 and/or an upper edge 117 of the shutter gate 111 can extend through a guide assembly 151 in the top wall 74 of the cutter housing 58. The guide assembly 151 can include a slot or curved slot 152. The plate 112 can be rotated within the slot 152 so as to travel between the discharge arrangement 105 and the mulch arrangement 106. The slot 152 can include a first slot end 153 and a second slot end 154. The first slot end 153 can be provided forward, on the cutter housing 58, as compared to the second slot end 154.

Figure 8:
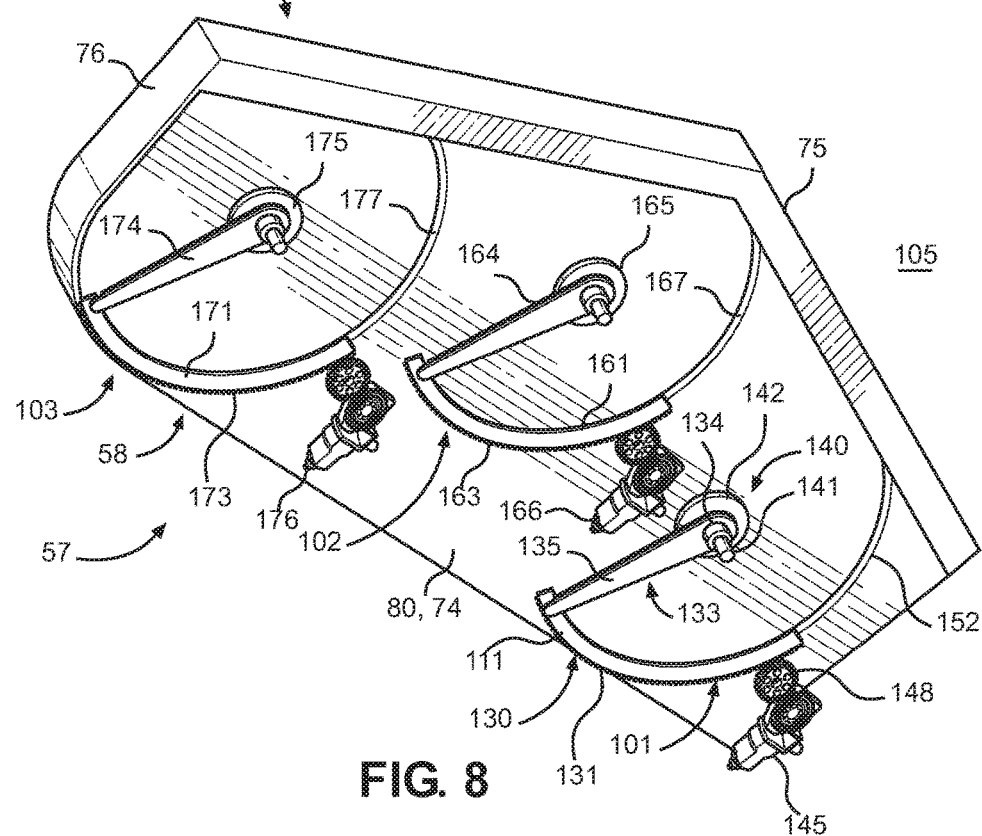
FIG. 8 is a top perspective view of the lawnmower cutter housing of FIG. 5 in a discharge arrangement.

FIG. 8 shows a shutter gate assembly 101 and provides a top perspective view of the cutter housing 58. In this arrangement, the shutter gate 111 has been rotated clockwise, from a top perspective, so as to be disposed in a discharge position/arrangement 105. In the discharge arrangement, the second end 115 of the plate 112 can be abutted to or proximate to the second slot end 154. The first end 114 of the plate 112 can be positioned at or adjacent to the driving gear 148. It may be desirable for the driving gear 148 not to lose contact with or engagement with the curved gear rack 131 so as to maintain operative engagement between the driving gear 148 and the curved gear rack 131. As desired, the plate 112 can be moved from the discharge arrangement 105, shown in FIG. 5 and FIG. 8, to the mulch arrangement 106 shown in FIG. 6. In such operation, from the top perspective view shown in FIG. 8, the plate 112 can be rotated counterclockwise. Upon the mulch arrangement 106 being attained, the first end 114 of the plate 112 can be abutted to or proximate to the first slot end 153. Relatedly, the curvature of the slot 152 can be provided with consistent radius, from the blade spindle 141 and/or spindle assembly 140, to provide for free and easy rotation of the plate 112. Relatedly, it is appreciated that variance of the curvature of the slot 152 relative to the path of rotation of the plate 112 can result in binding of the plate 112 during rotation.

Figure 7:
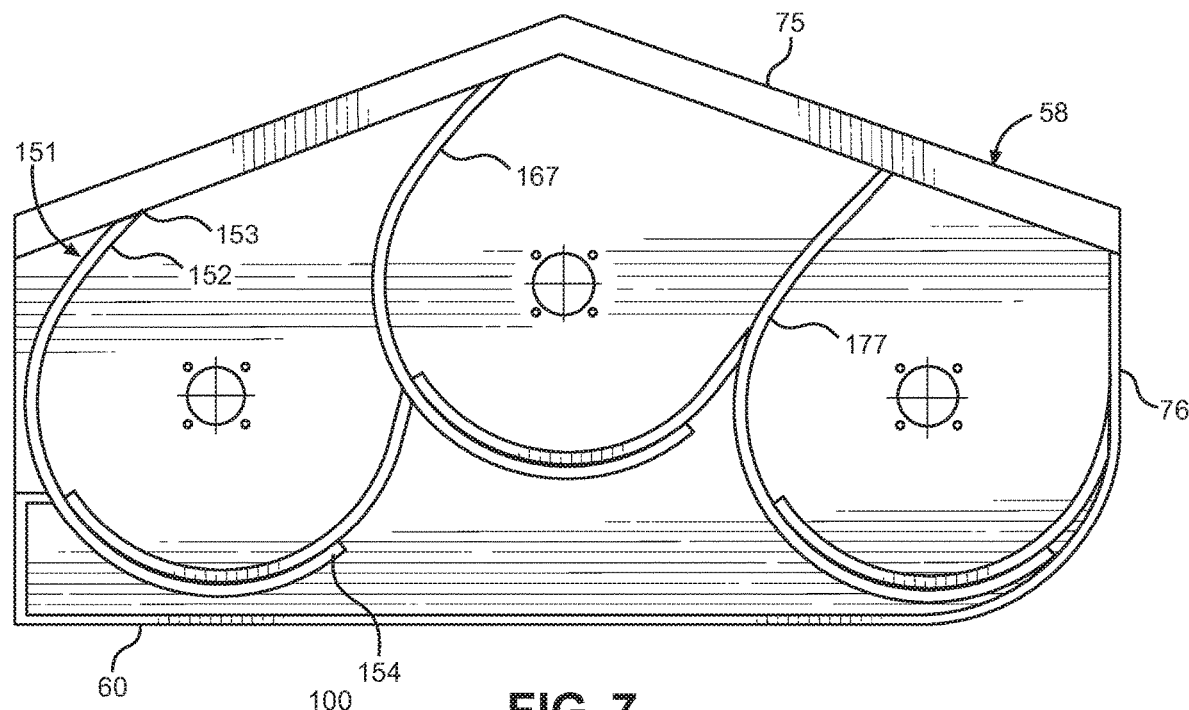
FIG. 7 is a bottom view of the lawnmower cutter housing of FIG. 5 with blades, blade spindle assemblies, and shutter gates removed so as to show slots in the cutter housing.

FIG. 7 is a bottom view of the lawnmower cutter housing 58 of FIG. 5 with blades 68, 69, 70, blade spindle assemblies 140, 165, 175, and shutter gates 111, 161, 171 removed so as to show slots 152, 167, 177 in the cutter housing. The slots can be positioned so as to run alongside the respective chamber walls 65, 66, and 67. When supported in the slots, the shutter gates 111, 161, 171 can be positioned alongside the respective chamber walls 65, 66, 67. As shown in FIG. 5 and FIG. 6, a lower edge of the shutter gates 111, 161, 171 can be provided to extend downward the same distance or height as a lower edge of the chamber walls 65, 66, 67.

As described above, the curved gear rack 131, or other driven element 130, can be driven by a driving gear or pinion gear 148. The driving gear 148 can be rotatably or pivotably mounted upon the top wall 74 by a suitable bearing assembly. The driving mechanism 145 that includes driving gear 148 can be mounted upon or attached to an upper surface 80 of the top wall 74 of the cutter housing 58. For example, the driving mechanism 145 can be welded to the top wall 74 of the cutter housing 58 or otherwise attached. For example, the driving mechanism 145 can be attached to the top wall 74 of the cutter housing 58 using mechanical fasteners, such as screws, bolts, brackets, and/or support flanges, for example. The driving gear 148 can be driven by a gear assembly or gear configuration 147. The gear assembly 147 can be driven by a motor 146, which can be in the form of or include an electric motor. The driving mechanism 145 can be powered by other types of motors, such as a pneumatic motor, or from a power take-off taken from the lawnmower's prime mover. The driven element 130 of the shutter gate 111 and the driving mechanism 145 can collectively constitute a gear system 144. Such a gear system 144 can likewise be provided to drive a second shutter gate assembly 102 and a third shutter date assembly 103, as described further below.

The motor 146 can be connected to a control regulator 155. Control wires 156 can be used to connect the motor 146 to the control regulator 155. The control regulator 155 can provide power to the motor 146 and/or control the connection of power to the motor 146.

The control regulator 155 can be operated by an operator or user of the lawnmower. For example, the control regulator 155 can be provided on a control panel of the lawnmower. The operator of the lawnmower, by using the control regulator 155, can control rotation of the shutter gate 111 between the discharge arrangement 105, the mulch arrangement 106, and interim positions to provide partial mulching/discharge.

The first shutter gate assembly 101 can be characterized as including a first shutter gate 111, a first radius arm 133, a first spindle assembly 140, and a first driving mechanism 145. The first shutter gate 111 can be characterized as including a first plate or curved plate 112 and a first driven element 130. As shown in FIGS. 5-8, the shutter system 100 can also include additional shutter gate assemblies. Specifically, the shutter system 100 can include a second shutter gate assembly 102 and a third shutter gate assembly 103.

The second shutter gate assembly 102 can be the same or similar in structure to the first shutter gate assembly 101. The second shutter gate assembly 102 can include a second shutter gate 161, a second radius arm 164, a second spindle assembly 165, and a second driving mechanism 166. The second shutter gate 161 can include a second plate 162 and a second driven element 163. The second driven element 163 can include a curved gear rack the same as or similar to the curved gear rack 131. The second shutter gate 161 can selectively block or not block the second discharge opening 72, i.e., the opening between the first cutting chamber 61 and the second cutting chamber 62. That is, the second driving mechanism 166 can be controlled by an operator of the lawnmower to selectively drive the second shutter gate 161 between a discharge position/arrangement 105 (as shown in FIG. 5) and a mulch position/arrangement 106 (as shown in FIG. 6). The second driving mechanism 166 can engage with the second driven element 163 to cause rotation of the shutter gate 161. For example, the second driving mechanism 166 can be in the form of a gear that engages with a curved gear rack of the second driven element 163. The second radius arm 164 can be supported by a second spindle assembly 165. In turn, the second plate 162 can be supported by the second radius arm 164. During rotation, the second plate 162 can be supported by and/or guided by a second slot 167 of the guide assembly 151. The control regulator 155 can be connected to the second driving mechanism 166 so as to control rotation of the second shutter gate 161, similarly to the first driving mechanism 145.

The third shutter gate assembly 103 can be the same or similar in structure to the first shutter gate assembly 101. The third shutter gate assembly 103 can include a third shutter gate 171, a third radius arm 174, a third spindle assembly 175, and a third driving mechanism 176. The third shutter gate 171 can include a third plate 172 and a third driven element 173. The third driven element 173 can include a curved gear rack the same as or similar to the curved gear rack 131. The third shutter gate 171 can selectively block or not block the third discharge opening 73, i.e., the opening between the second cutting chamber 62 and the third cutting chamber 63. That is, the third driving mechanism 176 can be controlled by an operator of the lawnmower to selectively drive the third shutter gate 171 between a discharge arrangement 105 (as shown in FIG. 5) and a mulch arrangement 106 (as shown in FIG. 6). During rotation, the third driving mechanism 176 can engage with the third driven element 173. For example, the third driving mechanism 176 can be in the form of a gear that engages with the curved gear rack of the third driven element 173. The third radius arm 174 can be supported by a third spindle assembly 175. In turn, the third plate 172 can be supported by the third radius arm 174. In rotation, the third plate 172 can be supported and/or guided by a third slot 177 of the guide assembly 151. The control regulator 155 can be connected to the third driving mechanism 176 so as to control rotation of the third shutter gate 171, similar to the first driving mechanism 145.

As shown in FIGS. 5-8, the driven elements 130, 163, 173 are provided, on the upper edge of respective plates 112, 162, 172. Thus, as shown, the driven elements 130, 163, 173 are positioned on top of or above the top wall 74 of the cutter housing 58. The driven elements 130, 163, 173 can be driven by respective driving mechanisms 145, 166, 176 that are also disposed on top of or above the top wall 74 of the cutter housing 58. However, the disclosure is not limited to such particulars. For example, the driven elements 130, 163, 173 can be positioned underneath the top wall 74, and can extend along a side of the plate 112. Relatedly, the driving mechanisms 145, 166, 176 can also be positioned underneath the top wall 74. A support slide flange, such as support slide flange 125, can still be provided above the top wall 74 so as to slidably support the respective plate 112, 162, 172. For example, the driven element 130 and driving mechanism 145 can be enclosed or partially enclosed in a box, compartment, or protective flange. Accordingly, such components can be protected from impact from objects and/or yard debris building up on such components. Positioning the driven element 130 and the driving mechanism 145 underneath the top wall 74 so as to conceal such components. It can be advantageous to position the driven element 130 and the driving mechanism 145 above the top wall 74 so as to provide ease and maintenance. For example, a malfunctioning driving mechanism 145 positioned above the top wall 74 might be easier to work with than compared to a malfunctioning driving mechanism 145 positioned below the top wall 74. In a particular cutter housing, some of the driven elements 130 and the driving mechanism 145 can be positioned underneath the top wall 74, whereas some of the driven elements 130 and the driving mechanism 145 can be positioned above the top wall 74.

It is appreciated that instead of the three motors and/or driving mechanisms shown in FIG. 8, a shutter system 100 can include one motor that is attached to each shutter gate 111, 161, 171 by actuators or a gear arrangement. For example, the actuators can include linkages that operatively attach the one or more motors and/or driving mechanisms.

In addition, various components of embodiments of the disclosure can be made from any of a variety of materials including, for example, steel, metal, plastic, plastic resin, nylon, composite material, and/or rubber, for example, or any other material as may be desired.

Features, elements and/or characteristics described with respect to one embodiment of the disclosure may be variously used with other embodiments of the disclosure as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized. For example, metal stamping or cutting, as well as bending, can be utilized in construction of the cutter deck or the plates.

For example, embodiments are disclosed above in which the plate 112, i.e. the curved plate, is constructed of a single or unitary piece. However, embodiments are intended to include or otherwise cover a plate 112 that includes or is constructed of multiple pieces. For example, multiple pieces of the plate 112 can be constructed in pieces, such as by a metal stamping process, bending, and then connected together such as by, but not limited to, spot welding or mechanical fastener, for example.

Exemplary embodiments are disclosed above in which the guide assembly 190, including slots 152, 167, 177 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter gate assembly is intended to be utilized. For example, different sized slots can be used for different cutting chambers.

The cutter housing 58 of FIG. 5 shows a symmetrical asynchronous layout for the blades 68, 69, 70 with the center blade offset in a forward direction with respect to the travel direction of the lawnmower 30 and the outboard blades 68, 70 aligned in a transverse direction of the lawnmower 30. However, alternate embodiments can include other asynchronous or synchronous layouts. For example the center blade 69 can be offset rearwardly with respect to the outboard blades 68, 70. In another exemplary embodiment, the center blade 69 can be offset rearwardly with respect to one of the outboard blades 68, 70, and the other of the outboard blades 68, 70 can be offset rearwardly with respect to each of the center blade 69 and the one of the outboard blades 68, 70.

While the subject matter has been described in detail with reference to exemplary embodiments thereof, it will be apparent to one skilled in the art that various changes can be made, and equivalents employed, without departing from the scope of the disclosure.

What is claimed is:

1. A cutter housing assembly for a lawnmower comprising:
    a cutter housing that includes a cutting chamber, with a discharge opening, a blade spindle for supporting a cutting blade, a top wall that extends across the cutting chamber, and a slot that extends through the top wall;
    a driving mechanism that is mounted on the cutter housing;
    a radius arm mounted on the blade spindle such that the radius arm is rotatable about the blade spindle; and
    a shutter gate that is arcuate in shape, and the shutter gate is mounted on the radius arm so as to rotate with the radius arm, and
    rotation of the shutter gate provides (a) a discharge arrangement at a first position in which the shutter gate is positioned relative to the discharge opening to provide a first gap associated with the first discharge opening, and (b) a mulch arrangement at a second position different from the first position and in which the shutter gate is positioned relative to the discharge opening to provide a decreased gap, relative to the first gap, associated with the first discharge opening, wherein
    the shutter gate includes a driven element,
    the driving mechanism is engaged with the driven element to rotate the shutter gate, and
    the shutter gate passes through the slot such that the shutter gate is positioned inside the cutting chamber and above the top wall in each of the discharge arrangement and the mulch arrangement.

2. The cutter housing assembly of claim 1, wherein the driven element includes gate gear teeth; and
    the driving mechanism includes a driving gear that is meshed with the gate gear teeth.

3. The cutter housing assembly of claim 2, wherein the driving mechanism includes an electric motor that drives the driving gear.

4. The cutter housing assembly of claim 3, further including a control regulator, and the electric motor is operatively connected to the control regulator for control of rotation of the shutter gate by a user.

5. The cutter housing assembly of claim 2, wherein the shutter gate includes a curved plate with a first side, a second side, and an upper edge, and the gate gear teeth are included in a curved gear rack that extends along the upper edge on the first side of the plate.

6. The cutter housing assembly of claim 5, wherein the shutter gate further includes a support slide flange that extends along the upper edge on the second side of the plate, and
    the support slide flange has a lower slide surface that slides along an upper surface of the cutter housing during rotation of the shutter gate.

7. The cutter housing assembly of claim 6, wherein the second side of the plate includes an inner, concave surface that faces the cutting chamber; and
    the first side of the plate includes an outer, convex surface that opposes the second side.

8. The cutter housing assembly of claim 2, wherein the driving mechanism is attached to the top wall of the cutter housing;
    the driven element, of the shutter gate, is positioned above the top wall so as to engage with the driving mechanism, and the driving mechanism includes:
    a driving gear that engages the driven element; and
    a motor that drives the driving gear, with the motor attached to the top wall.

9. The cutter housing assembly of claim 2, wherein the shutter gate includes a first end, a second end, a lower edge, and an upper edge that, collectively, define a curved plate in the shape of a cylindrical segment.

10. The cutter housing assembly of claim 2, wherein the radius arm includes an elongated member with an inner end portion and an outer end portion,
    the inner end portion is affixed to the blade spindle, and the outer end portion is attached to the shutter gate.

11. A cutter housing assembly for a lawnmower comprising:
    a cutter housing that includes a cutting chamber, with a discharge opening, a blade spindle for supporting a cutting blade, a top wall, and a slot that extends through the top wall;
    a driving mechanism that is mounted on the cutter housing, and the driving mechanism includes a motor;
    a radius arm mounted on the top wall of the cutter housing and configured to rotate about a blade spindle axis; and
    a shutter gate that is curved in shape, and the shutter gate is mounted on the radius arm so as to rotate with the radius arm about the blade spindle axis, and the shutter gate includes a continuous wall that passes through the slot,
    the shutter gate rotatable between (a) a discharge position in which the continuous wall of the shutter gate is positioned relative to the discharge opening to provide a first gap associated with the first discharge opening, and (b) a mulch position in which the continuous wall of the shutter gate is located relative to the discharge opening to provide a decreased gap, relative to the first gap, associated with the first discharge opening, wherein
    the shutter gate includes a driven element, which is disposed above the top wall; and
    the driving mechanism is operatively engaged with the driven element to cause the shutter gate to rotate when the driving mechanism is actuated.

12. The cutter housing assembly of claim 11, wherein the radius arm is mounted on the blade spindle.

13. The cutter housing assembly of claim 11, further including a control regulator, and the motor is operatively connected to the control regulator for control of rotation of the shutter gate by a user.

14. The cutter housing assembly of claim 11, wherein the continuous wall is a curved plate, and the curved plate is positioned alongside a wall of the cutting chamber in the discharge arrangement.

15. The cutter housing assembly of claim 11, further comprising a plurality of cutting chambers, a plurality of blade spindles, a plurality of driving mechanisms mounted on the cutter housing, a plurality of radius arms mounted on the top wall of the cutter housing and configured to rotate about a respective blade spindle axis, and a plurality of shutter gates.

16. A lawnmower comprising:
   a prime mover that provides power to the lawnmower; and
   at least one cutter housing assembly, and each cutter housing assembly including:
      a cutter housing that includes a cutting chamber, with a discharge opening, a blade spindle for supporting a cutting blade, a top wall that extends across the cutting chamber, and a slot that extends through the top wall;
      a driving mechanism that is mounted on the cutter housing;
      a radius arm mounted on the cutter housing and configured to rotate about a blade spindle axis; and
      a shutter gate that is arcuate in shape and is mounted on the radius arm so as to rotate with the radius arm between
         (a) a discharge position in which the shutter gate is located relative to the discharge opening to provide a first gap associated with the first discharge opening, and
         (b) a mulch position in which the shutter gate is located relative to the discharge opening to provide a decreased gap, relative to the first gap, associated with the first discharge opening, wherein
      the shutter gate includes a driven element provided at an upper portion of the shutter gate, and the driving mechanism is engaged with the driven element to cause the shutter gate to rotate when the driving mechanism is actuated, and
      the shutter gate passes through the slot such that the shutter gate is positioned inside the cutting chamber and above the top wall in each of the discharge position and the mulch position.

17. The lawnmower of claim 16, wherein the driven element includes gate gear teeth; and
   the driving mechanism includes a gear that is meshed with the gate gear teeth.

18. The lawnmower of claim 16, further comprising a plurality of cutting chambers, a plurality of blade spindles, a plurality of driving mechanisms mounted on the cutter housing, a plurality of radius arms mounted on the top wall of the cutter housing, and a plurality of shutter gates.

19. The cutter housing assembly of claim 1, wherein the shutter gate includes a cylindrical wall that passes through the slot and moves within the slot to form the first gap and the second gap.

* * * * *